United States Patent [19]

Stauter et al.

[11] 4,029,734
[45] June 14, 1977

[54] RECOVERY OF CHROMIUM VALUES

[75] Inventors: John C. Stauter, Itasca; Richard T. Um, Mount Prospect, both of Ill.

[73] Assignee: UOP Inc., Des Plaines, Ill.

[22] Filed: Feb. 19, 1976

[21] Appl. No.: 659,390

[52] U.S. Cl. .................................. 423/54; 423/49; 423/52; 423/57; 75/115; 75/116
[51] Int. Cl.² ........................................ C01G 37/00
[58] Field of Search .............. 423/49, 52, 54, 57; 75/115, 116

[56] References Cited

UNITED STATES PATENTS

| | | | |
|---|---|---|---|
| 1,279,110 | 9/1918 | Haslup | 423/52 |
| 2,176,774 | 10/1939 | Sweet et al. | 75/115 |
| 2,601,306 | 6/1952 | Lloyd et al. | 75/115 |
| 3,082,080 | 3/1963 | Simons | 423/52 |
| 3,085,875 | 4/1963 | McCarroll | 423/49 |
| 3,106,451 | 10/1963 | Globus | 423/49 |
| 3,244,513 | 4/1966 | Zubryckyj et al. | 75/115 |
| 3,906,075 | 9/1975 | Menz | 423/52 |

FOREIGN PATENTS OR APPLICATIONS 798,326 7/1958 United Kingdom ............ 423/54

OTHER PUBLICATIONS

Adam et al., "Talanta," vol. 18, 1971, pp. 91-95.

*Primary Examiner*—Herbert T. Carter
*Attorney, Agent, or Firm*—James R. Hoatson, Jr.; Raymond H. Nelson; William H. Page, II

[57] ABSTRACT

Chromium values may be recovered from the chromium bearing ores or sources by subjecting the chromium bearing source to a roast in the presence of sulfuric acid and an oxidant which contains manganese compounds at temperatures ranging from about 200° to about 500° C. followed by leaching, separation and solvent or ion exchange extraction whereby chromium is selectively extracted and recovered.

8 Claims, 1 Drawing Figure

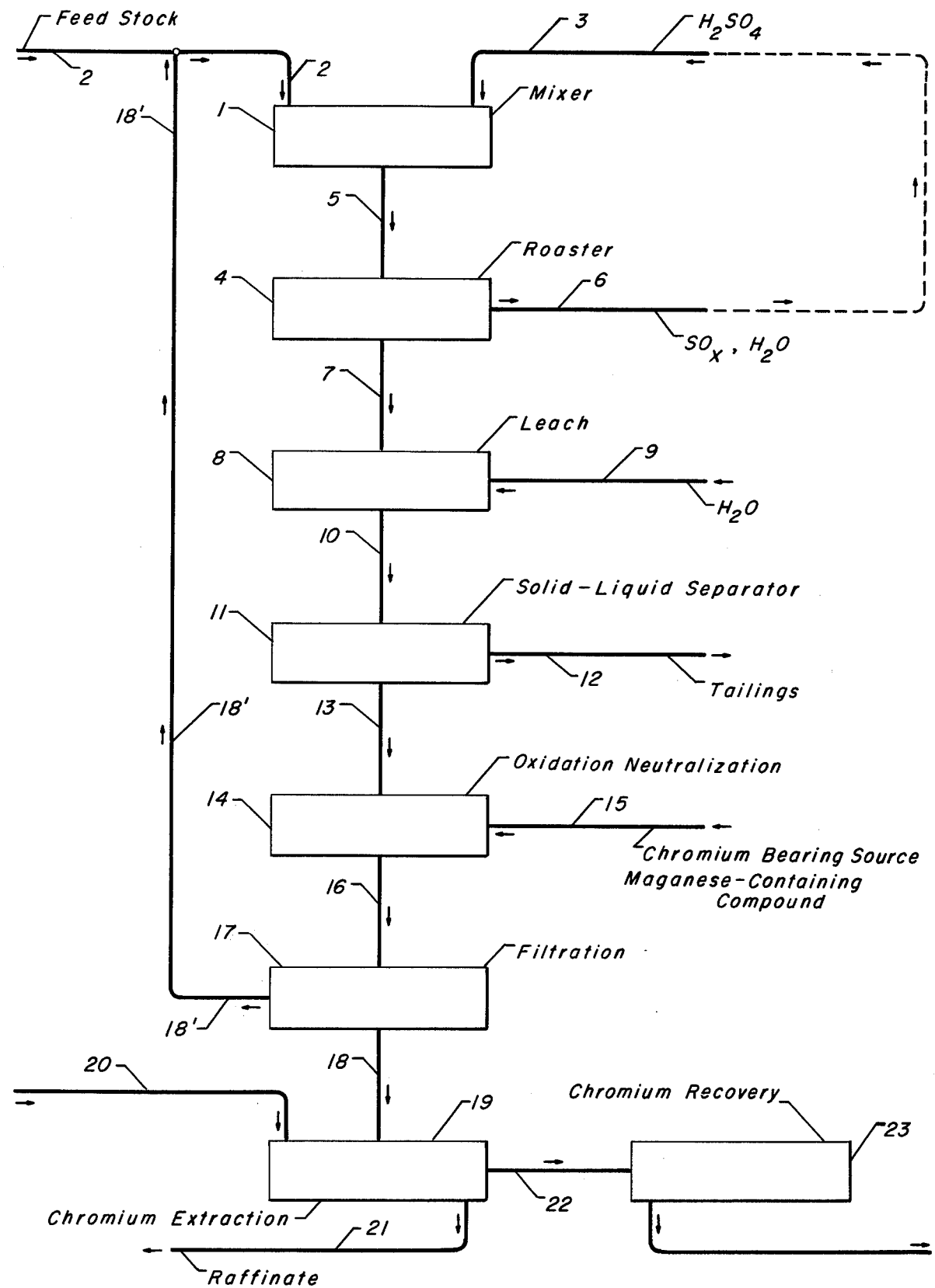

RECOVERY OF CHROMIUM VALUES

BACKGROUND OF THE INVENTION

Chromium metal is relatively expensive and in high demand for use in industry. For example, the metal is used as an ingredient in stainless steels and as a plating material for imparting a bright surface for other metals. In addition, it is also used as a component in other alloys which are characterized by high strength and corrosion resistance especially at high temperatures. One important source of chromium metal is from the ore known as chromite which is a mixture of ferrous oxide and chromium oxide. As is well known the production of the ore in the United States is relatively small, there being virtually no chromium refining plants in the United States to treat low grade chromite ores.

The conventional methods for recovering chromium from high grade ores consists of sintering chromite with sodium carbonate followed by water leaching, acidification, crystallization of sodium dichromate, fusion with sulfur and final reduction of chromium oxide to chromium using charcoal or aluminum. Another method for obtaining chromium from a low grade chromite ore consists of the digestion of the chromite ore with strong sulfuric acid and return chromic acid. The resulting chromic sulfate solution is then purified by crystallization followed by electrowinning to recover chromium metal. Yet another method for processing low grade chromite ore is disclosed in U.S. Pat. No. 3,772,422 in which said low grade chromite ore utilizes a high pressure nitric acid leach.

As will hereinafter be set forth in greater detail, it has now been discovered that chromium metal or compounds may be recovered from chromite ore by subjecting said ore to a roast in the presence of sulfuric acid and an oxidant of a specific type which contains manganese.

This invention relates to a process for the recovery of chromium values from a chromium bearing source. More specifically the invention is concerned with an improvement in a process for obtaining maximum chromium values from a chromium bearing source such as chromite ore in a series of steps hereinafter set forth in greater detail.

Heretofore, prior art methods of obtaining chromium from chromium bearing sources have involved a relatively complicated system which includes treatment with alkalis or acids, followed by crystallization, purification, fusion, reduction, etc. In contradistinction to this, it has now been discovered that relatively high extractions of chromium may be obtained from chromium bearing sources by treating said chromium bearing source with an acid in the presence of an oxidant followed by separation and extraction whereby a practically quantitative yield of the chromium in the chromium bearing source may be separated and recovered.

It is therefore an object of this invention to provide a process for obtaining chromium from a chromium bearing source.

More specifically the invention is concerned with an improvement in a process for obtaining chromium from a chromium bearing source whereby the desired metal may be recovered in a substantially greater yield than has heretofore been possible.

In one aspect an embodiment of this invention resides in a method for the recovery of chromium values from a chromium bearing source which comprises subjecting said chromium bearing source to a roast in the presence of sulfuric acid and an oxidant comprising a compound containing manganese in at least a +4 state at an elevated temperature, leaching the resulting pulp with water, filtering the leach solution to separate undissolved solids and pregnant leach liquor containing dissolved chromium ions and metals from said oxidant, subjecting said pregnant leach liquor to solvent or ion exchange resin extraction to selectively extract said chromium ion, separating the aqueous raffinate from the loaded organic phase or ion exchange resin, and recovering the chromium from said loaded organic phase or ion exchange resin.

A specific embodiment of this invention is found in a method for the recovery of chromium values from a chromium bearing source which comprises subjecting chromite ore to a roast at a temperature in the range of from about 200° to about 500° C. in the presence of sulfuric acid and sea nodules, leaching the resulting pulp with water, filtering the leach solution to separate undissolved solids and pregnant leach liquor, treating said pregnant leach liquor with an additional amount of chromite ore and sea nodules, subjecting said treated pregnant leach liquor to solvent extraction with tricapryl amine to selectively extract the chromium ion, separating the aqueous raffinate from the loaded organic phase containing the chromium ion and recovering chromium from the loaded organic phase.

Other objects and embodiments will be found in the following further detailed description of the present invention.

As hereinbefore set forth the present invention is concerned with an improved process for the recovery of chromium values from a chromium bearing source, a specific example of this being chromite ore. In the process of this invention the chromium bearing source is combined with an oxidant comprising a manganese-containing compound such as sea nodules, manganese dioxide, etc., in which the manganese is present in at least a +4 valence state. The composition of the feedstock is accomplished by grinding the two components by means of a ball mill or any other method known in the art to a size less than about 48 mesh (Tyler). By utilizing a feedstock comprising a mixture of sea nodules or manganese dioxide and chromite, it is possible to obtain a synergistic effect in that the chromite requires an oxidizing agent for optimum extraction, said oxidative properties being afforded by the presence of the sea nodules or manganese dioxide. The two components, after being ground to the desired size, are intimately mixed and thereafter pugged with concentrated sulfuric acid. In the preferred embodiment of the invention, the three components, namely, the chromite ore, the manganese-containing compound and the sulfuric acid are present in the mixture in a weight ratio ranging from about 1:1:1 to about 1:2:10 weight % of chromium bearing source, manganese +4-containing compound and sulfuric acid respectively. In the preferred embodiment of the invention, concentrated sulfuric acid constitutes the acidic portion of the mixture, although it is also contemplated that sulfuric acid solutions containing less than the concentrated amount may also be utilized. The pugged mixture of the three components is then placed in an appropriate vessel such as a pot furnace and subjected to a baking operation which is effected in a range of from about 200° to about 500° C. and preferably at a temperature in the range of from about 250°–400° C. for a period of time sufficient to remove a major portion of the water content plus excess sulfuric acid. The aforesaid heating step is effected for a period ranging from about 5 minutes up to about 30 minutes or more depending upon the temperature of the baking step and the amount of water and acid which is to be withdrawn. The aforesaid baking of the mixture will be effected until the mixture of chromite ore and manganese-containing compound is still in a damp state.

Upon completion of the baking step, the mixture is then leached with a sufficient amount of water and subjected to agitation for a period of time ranging from about 0.5 to about 4 hours or more while maintaining the temperature of the solution in a range of from about 25° to about 95° C. Following completion of the leaching step, the resulting leach solution is subjected to a separation step such as filtration, decantation, etc., whereby the undissolved solids or gangue are separated from the pregnant leach liquor which contains dissolved chromium ions as well as dissolved metal ions from the manganese-containing oxidant compound. Inasmuch as the leach solution contains a relatively high acid content due to the damp bake process, plus the fact that some of the chromium can still be in a +3 state and, as such, it not readily available for separation by solvent extraction, it is contemplated within the scope of this invention that an additional amount of chromium bearings source and manganese-containing compound may be slurried in the pregnant leach liquor. This neutralization-oxidation treatment by the addition of the chromium bearing source and manganese-containing compound will oxidize the chromium ions which are present in a +3 state up to chromium ions in a +6 state, the latter state forming an anionic species which is easily and selectively extracted by utilizing organic solvents of the type hereinafter set forth in greater detail.

The desired chromium ions which are in a +6 state along with other dissolved ions such as manganese, copper, nickel, cobalt, zinc, calcium, magnesium, sodium, potassium, aluminum, and iron which are present in the filtrate are thereafter subjected to solvent extraction with an organic solvent whereby the hexavalent chromium is selectively extracted and passed into the loaded organic phase while the remaining metallic ions remain in the aqueous phase. In the preferred embodiment of the invention, the organic solvent which is utilized to selectively extract the chromium ions comprises an organic amine which may be either primary, secondary or tertiary in nature. The organo portion of the amine will preferably contain from 1 to about 16 carbon atoms, said organo portion being a straight-chained aliphatic, branch-chained aliphatic, cycloaliphatic containing from 3 to 8 carbon atoms, or aryl moiety. Some specific examples of these organic amine compounds will comprise primary amines such as methyl amine, ethyl amine, propyl amine, isopropyl amine, n-butyl amine, sec-butyl amine, t-butyl amine, n-pentyl amine, sec-pentyl amine, caproyl amine, sec-hexyl amine, the isomeric heptyl, capryl, nonyl, capric, undecyl, dodecyl, tridecyl, tetradecyl, pentadecyl, hexadecyl amines, cyclopropyl amine, cyclobutyl amine, cyclopentyl amine, cyclohexyl amine, cycloheptyl amine, phenyl amine, benzyl amine, p-tolyl amine, o-tolyl amine, m-tolyl amine etc.; secondary amines such as dimethyl amine, dipropyl amine, di-n-butyl amine, di-t-butyl amine, di-sec-pentyl amine, di-sec-hexyl amine, the isomeric dicapryl, dicapric, didodecyl, ditetradecyl, dihexadecyl amines, dicyclobutyl amine, dicyclohexyl amine, dibenzyl amine, di-o-tolyl amine, etc.; tertiary amines such as triethyl amine, triisopropyl amine, tri-sec-butyl amine, tri-n-pentyl amine, tricaproyl amine, the isomeric triheptyl, tricapryl, trinonyl, triundecyl, tritridecyl, tripentadecyl amines, tricyclopropyl amine, tricyclopentyl amine, tricycloheptyl amine, triphenyl amine, tri-p-tolyl amine, tri-m-tolyl amine, etc. It is also contemplated within the scope of this invention that the chromium may be extracted by subjecting the solution to the action of a weak or strong base anion exchange resin. Examples of these resins would include amine-substituted styrene-divinylbenzene copolymeric systems sold under the trade names of Dowex 11, Dowex 1-X8, Dowex 12K, Dowex 2X-8, etc. as well as other tertiary or quaternary ammonium salts of resins.

Following the selective extraction of the chromium ions, the loaded organic phase or the ion exchange phase or the ion exchange resin containing said chromium ion is separated from the aqueous raffinate by conventional means and the chromium is stripped from said organic phase or resin by utilizing an ammoniacal solution such as aqueous ammonium hydroxide. The resultant ammonium chromate may then be treated in any manner known in the art to recover chromium, as the metal or attendant compounds. It is also contemplated within the scope of this invention that prior to stripping of the loaded organic phase or resin by the ammoniacal solution, it may be necessary to wash the loaded organic phase or resin with fresh water whereby any entrapped manganese or iron which may be present is removed. This is necessary inasmuch as the presence of any manganese or iron in the loaded organic phase which is treated with the ammoniacal solution would cause hydrolysis of the manganese or iron upon contact with the alkali stripping solution and form an emulsion which would hinder the recovery of the chromium.

As will hereinafter be shown in greater detail in the examples which are appended to the end of this specification, it is possible to obtain chromium values in a relatively high yield, that is, above 90%, when utilizing the process of this invention. This high yield of the desired chromium values contrasts to the lower yields which were obtained when utilizing other types of extraction for chromium ores such as leaching the ore with ammonium hydroxide at ambient temperature and pressure of about 5 psi of oxygen; "Caron" type of reduction roasting followed by the ammonium hydroxide leach in the presence of oxygen; roasting with producer gas followed by ammonium carbonate leaching in the presence of oxygen; electro-oxidation in a sodium hydroxide solution; air roasting followed by sodium hydroxide, hydrochloric acid or nitric acid leaching; roasting with sodium chloride followed by water leching; gas roasting with sulfur dioxide followed by sulfuric acid leaching, roasting with ammonia followed by water leaching; ferric chloride leaching; sodium carbonate leaching followed by hydrochloric acid leaching or phosphoric acid leaching.

The present invention will be further illustrated with reference to the accompanying drawing which schematically illustrates a simplified flow diagram of the process of the present invention. However, it is to be understood that the flow diagram is in schematic form only and that all valves, condensers, pumps, controllers, etc., have been eliminated as not being essential to the complete understanding of the present invention. The utilization of these, as well as other similar appurtenances, will be obvious as the drawing is described.

In the drawing, a feedstock comprising a mixture of a chromium bearing source such as chromite ore and a manganese-containing compound in which the manganese is present in at least a +4 valence state such as sea nodules, manganese ore, etc., which acts as an oxidant in the process and which has been previously ground to the desired size is charged to mixer 1 through line 2. In addition, the aforesaid portion of the mixture comprising, in the preferred embodiment of the invention, concentrated sulfuric acid, is also charged to mixer 1 through line 3. After the mixture has been pugged in mixer 1, it is charged to roaster 4 through line 5. In roaster 4 the mixture is baked for a period of time within the range hereinbefore set forth until a sufficient amount of water and sulfur oxides has been withdrawn through line 6 so that the mixture is in a caked form but still retains a sufficient amount of acid to avoid being completely dry. As illustrated in this drawing, the mixture of water and sulfur oxides may be recycled to mixer 1 through line 3 after being combined in an apparatus not shown in the drawing to form the desired sulfuric acid. The roaster mixture of chromium bearing source and manganese-containing compound is withdrawn from roaster 4 through line 7 and passed to a leaching apparatus 8 wherein the solid mixture is leached with water which is charged to leaching apparatus 8 through line 9. The leaching apparatus wherein the mixture undergoes leaching is provided with heating means, also not shown, in order that the aforesaid leach of the solid mixture with water may be effected at temperatures ranging from about 25° to about 95° C. After leaching the mixture for a predetermined period of time, the solution containing undissolved solids is withdrawn from leaching apparatus 8 through line 10 and is passed to separation means 11 wherein the pregnant leach liquor is separated from undissolved solids. The undissolved solids which comprise tailings are withdrawn from separation means 11 through line 12. The separation means wherein the solid and liquids are separated may comprise any means known in the art such as vacuum filter, pressure filter, centrifuges, thickeners, etc. The pregnant leach liquor is withdrawn from separation means 11 through line 13 and passed to further mixing means 14. In mixing means 14 the pregnant lech liquor which may contain chromium ions in a +3 valence state is subjected to a combined oxidation-neutralization step by admixture with an additional amount of chromium bearing source and manganese-containing compound which is charged to mixing means 14 through line 15. After oxidation and neutralization in which any chromium ions which are present in a +3 valence state are oxidized to a +6 valence state, the mixture is withdrawn through line 16 and passed to filtration means 17. In filtration means 17 the solid mixture of chromium bearing source and manganese-containing compound which has been used to oxidize the chromium is separated by conventional means of the type hereinbefore set forth and recycled through line 18[1] for admixture with the feedstock in line 2 which then passes into mixer 1. The pregnant leach liquor is withdrawn from filtration means 17 through line 18 and passed to chromium extraction means 19 wherein the leach liquor is contacted with an organic solvent of the amine type or an anion exchange resin which is charged to chromium extraction means 19 through line 20. After thorough admixture in chromium extraction means 19, the aqueous raffinate containing the manganese ions is withdrawn through line 21 while the loaded organic phase or the ion exchange resin containing the extracted chromium ions is withdrawn through line 22 and passed to chromium recovery means 23. In recovery means 23, the chromium may be recovered by stripping with ammonium hydroxide after having been washed to remove any entrapped manganese or iron which may still have been present.

The following examples are given as illustrations of the process of the present invention. However, it is to be understood that these examples are merely for illustrative purposes and are not intended to limit the generally broad scope of the present invention in strict accordance therewith.

EXAMPLE I

In this example 10 grams of a chromite ore which contains 14.4% chromium and 8% iron along with 10 grams of sea nodules which contain 4.1% iron, 1.2% nickel, 0.9% copper, 0.2% cobalt, 23.2% manganese (17.9% manganese as manganese dioxide) and 2.32% water were ground to -65 mesh and combined. Following this, 30 cc of concentrated sulfuric acid was added and the mixture pugged in a 300 cc beaker. The beaker was then placed in a pot furnace and the mixture was baked at a temperature of 400° C. for a period of about 10 minutes. Heating was discontinued after moisture content in the mixture had evaporated off and the excess sulfuric acid had fumed off. The beaker was withdrawn from the pot furnace and cooled in air. When the temperature of the beaker had reached about 60° C., the damp mixture was leached with 250 cc of water and agitated with a magnetically stirred bar for a period of about 3 hours while maintaining the temperature at 60° C.

The leach solution was filtered to separate the undissolved solids and 8 grams of a fresh mixture of chromite ore and sea nodules was added to the pregnant leach liquor to oxidize any chromium ions which were present in a +3 state. The resultant aforesaid aqueous mixture was then placed in a separatory funnel and 250 cc of an organic solvent comprising 5% by volume of a tricapryl tertiary amine solution, known in the trade as General Mills Alamine 336, 5% by volume of tributylphosphate, which acted as an emulsion breaker, and 90% by volume of kerosene was added. The mixture was agitated for a period of 1 minute and allowed to separate. The aqueous raffinate was separated from the loaded organic phase which contained the extracted chromium ion and the organic phase was then water washed with fresh water utilizing 250 cc of water to remove any extrapped manganese and iron. The aqueous layer was again separated from the organic layer and the latter was then treated with 250 cc of a 10% ammonium hydroxide solution. It was determined by analysis that 93.1% of the chromium in the chromite ore was recovered by the extraction process.

EXAMPLE II

To illustrate the necessity for the presence of a manganese-containing compound in which the manganese which is in a valence state of at least +4 is present in a weight ratio of from about 1:1 to about 2:1 per weight amount of chromite ore, a series of experiments was performed in which varying amounts of sea nodules were used as an oxidant with chromite ore. The mixtures of chromite ore and sea nodules were treated in a manner similar to that set forth in the above Example I, that is, by admixing the ore and sea nodules with sulfuric acid, baking, leaching, and extracting the chromium with an amine, The results of these experiments are set forth in Table I below:

TABLE I

| Experiment No. | 1 | 2 | 3 | 4 | 5 | 6 | 7 | 8 | 9 | 10 | 11 | 12 | 13 |
|---|---|---|---|---|---|---|---|---|---|---|---|---|---|
| Chromite ore g. | 10 | 10 | 10 | 10 | 10 | 10 | 10 | 10 | 20 | 20 | 10 | 10 | 5 |
| Sea Nodules g. | 1 | 2 | 3 | 5 | 5 | 5 | 8 | 10 | 20 | 20 | 10 | 10 | 5 |
| $H_2SO_4$ cc. | 40 | 30 | 20 | 20 | 40 | 10 | 20 | 30 | 50 | 50 | 30 | 30 | 30 |
| Bake Temp. °C. | 350 | 350 | 350 | 350 | 350 | 400 | 350 | 400 | 400 | 400 | 350 | 350 | 400 |
| Chromium Extraction % | 11.8 | 4.2 | 11.8 | 25.0 | 17.4 | 55.5 | 54.7 | 100 | 85.9 | 81.9 | 92.4 | 95.3 | 100 |

Thus it is apparent that when the amount of manganese which is present in the sea nodules in at least a +4 valence state is less than a 1:1 weight ratio to the chromite ore (Experiments 1 through 7), the extraction of chromium from the ore will be relatively low, that is, the percent extraction will range from 4.2 to 55.5%. In contradistinction to this, when the amount of manganese in at least a +4 valence state is present in at least a 1:1 and up to a 2:1 weight ratio as compared to the chromium (Experiments 8 through 13) the extraction of the desired chromium is relatively high, that is, from 81.9% to 100%.

EXAMPLE III

To illustrate the use of a different manganese-containing compound which acts as an oxidant for the chromium extraction from chromite ore, said oxidant having a synergistic effect upon the extraction process, 5 grams of chromite ore and 3 grams of manganese dioxide ore were admixed and ground to a screen size between 65 and 100 mesh. The mixed sample was pugged with 15 cc of concentrated sulfuric acid in a 300 cc beaker and heated in a pot furnace at 400° C. for a period of about 15 minutes. After water had evaporated off and the excess sulfuric acid had fumed off, the beaker was withdrawn from the furnace and cooled in air. In a manner similar to that set forth in Example I above, the mixture was leached with 250 cc of water and agitated with a magnetically stirred bar for a period of about 3 hours at 60° C. The undissolved solids were separated from the pregnant leach liquor by filtration and the liquor treated with an additional amount of a mixture of chromite ore and manganese oxide. After agitating and separating the mixture, the pregnant leach liquor was treated with an organic solvent consisting of a mixture of General Mills Alamine 336, Tributylphosphate and kerosene. After agitating the mixture, it was allowed to settle and the aqueous layer was separated from the loaded organic phase. The latter was water washed with water to remove any entrapped manganese and iron which may still have been present and separated. Following this, the chromium ion which was present in the organic phase was stripped by treating said organic phase with a 10% ammonium hydroxide solution. Analysis disclosed that 92% of the chromium was extracted by this method.

When the above example was repeated utilizing 5 grams of CP grade manganese dioxide in place of the manganese dioxide ore and using 20 cc of concentrated sulfuric acid while baking the mixture at a temperature of 300° C. for a period of 10 minutes, it was found that 94% of the chromium was extracted.

EXAMPLE IV

To illustrate the necessity for both the presence of a manganese-containing compound and the operating temperature parameters of a baking step in a range of from about 200° to about 500° C. further experiments were performed. In one experiment 10 grams of chromite ore was admixed with 0.5 grams of potassium permanganate and treated with various concentrations of sulfuric acid. The admixture of the chromite and potassium permanganate was leached with a 30% solution of sulfuric acid at a temperature of 105° C. for a period of 3 hours. Thereafter the mixture was treated in a manner similar to that hereinbefore set forth in the above examples, that is, was filtered and analyzed for chromium extraction. Analysis of the filtrate discloses that only 6.0% of the chromium was extracted.

A second experiment using potassium permanganate was effected by treating a mixture of 10 grams of chromite ore and 0.5 grams of potassium permanganate with a 50% solution of sulfuric acid at a temperature of 112° C. for a period of 3 hours. An analysis disclosed that 11.8% of the chromium was extracted. A third experiment utilizing a 70% solution of sulfuric acid and leaching at a temperature of 140° C. for a period of 3 hours resulted in the obtention of 15.3% of the chromium. When the mixture of chromite ore and potassium permanganate was treated with concentrated sulfuric acid of 90% concentration at a temperature of 155° C. for a period of 3 hours, the filtrate, upon analysis, disclosed the presence of 28.1% of the chromium which had been extracted. It is readily apparent that a baking step at a temperature in the range of from about 200° to about 500° C. is a required step in the process of this invention in order to obtain high yields of chromium.

EXAMPLE V

As another illustration of the necessity for the presence of a manganese-containing oxidant and operating temperatures within the range of the process of the present invention, a series of experiments was performed in which 10 grams of chromite ore was milled to less than 100 mesh. The chromite ore was admixed with 1 gram of potassium persulfate and the mixture was pugged with concentrated sulfuric acid at a temperature of 150° C. for a period of 2 hours. After treatment of the mixture in a manner similar to that set forth in Example I above, it was determined that 6.2% of the chromium was extracted from the ore. Likewise, when 3 grams of potassium persulfate was used in place of 1 gram and the experiment repeated, analysis of the solvent extract after stripping disclosed that 18.7% of the chromium has been extracted.

EXAMPLE VI

In this series of experiments the necessity for baking the chromium bearing source-manganese-containing compound with sulfuric acid at a temperature in the range of from about 200° to about 500° C. was illustrated when 1 gram of CP grade manganese dioxide was admixed with 10 grams of chromite ore and the mixture pugged with concentrated sulfuric acid. The mixture was leached at a temperature of about 150° C. for a period of 4 hours. After treatment of the mixture in a manner similar to that set forth in Example I above, it was determined that 14.6% of the chromium was extracted from the chromite ore. When this experiment was repeated using 3, 6 and 10 grams of manganese dioxide in admixture with 10 grams of chromite ore, it was found that the amount of chromite extracted amounted to 13.2, 22.2 and 58.3% respectively.

It is readily apparent from a comparison of the above examples that by utilizing the presence of a manganese-containing compound which acts as an oxidant and by effecting the baking of the mixture of chromium-containing source and manganese-containing compound with sulfuric acid at temperatures ranging from 200° to about 500° C., it is possible to obtain improved yields of the desired chromium value than is possible when extracting or leaching the chromium bearing source with oxidizing compounds such as a manganese-containing compound ore at temperatures lower than those which are employed in other processes.

We claim as our invention:

1. In the recovery of chromium values from a chromium bearing source, the improved method which comprises the steps of:
   a. forming a mixture of said chromium bearing source, sulfuric acid and a compound containing manganese in at least a +4 valence state in a weight ratio of from about 1:1:1 to about 1:2:10 chromium bearing source, manganese compound and sulfuric acid, respectively;
   b. roasting said mixture at a temperature of from about 200° to about 500° C for a sufficient time to remove the major portion of its water content and excess sulfuric acid;
   c. leaching the resultant damp pulp with water at a temperature of from about 25° to about 95° C;
   d. filtering the leach solution to separate undissolved solids from pregnant leach liquor containing dissolved manganese compound and chromium ions in a +3 valence state;
   e. subjecting the pregnant leach liquor to a neutralization-oxidation treatment with an additional amount of said chromium bearing source and manganese compound to oxidize said chromium ions to a +6 valence state; and
   f. thereafter selectively extracting chromium from the thus treated pregnant leach liquor.

2. The method as set forth in claim 1 in which said manganese compound is sea nodules.

3. The method as set forth in claim 1 in which said manganese compound is manganese dioxide.

4. The method as set forth in claim 1 in which said chromium bearing source is chromite ore.

5. The method of claim 1 in which the chromium is separated from said treated pregnant leach liquor in step (f) by extraction with an organic amine solvent.

6. The method as set forth in claim 5 in which said organic amine is tricapryl amine.

7. The method of claim 1 in which the chromium is separated from said treated pregnant leach liquor in step (f) by extraction with an ion exchange resin.

8. The method as set forth in claim 7 in which said ion exchange resin is a basic anion exchange resin.

* * * * *